United States Patent [19]

Wilson

[11] Patent Number: 5,662,428
[45] Date of Patent: Sep. 2, 1997

[54] SHAFT ASSEMBLY

[75] Inventor: Michael Wilson, Durham, United Kingdom

[73] Assignee: Black & Decker Inc., Newark, Del.

[21] Appl. No.: 760,013

[22] Filed: Nov. 20, 1996

Related U.S. Application Data

[63] Continuation of Ser. No. 336,814, Nov. 9, 1994, abandoned.

[30] Foreign Application Priority Data

Nov. 9, 1993 [GB] United Kingdom ............. 9323110

[51] Int. Cl.⁶ .................. A01G 3/06; A01D 50/00
[52] U.S. Cl. .................. 403/374; 403/367; 56/DIG. 18; 172/13; 30/276
[58] Field of Search .................. 403/367, 374; 30/276, 347; 56/400.04, 400.19, DIG. 18; 172/15, 13

[56] References Cited

U.S. PATENT DOCUMENTS

| | | | |
|---|---|---|---|
| 2,821,834 | 2/1958 | Walker | 56/400.19 |
| 3,515,418 | 6/1970 | Nielsen | 403/367 X |
| 4,052,789 | 10/1977 | Ballas, Sr. | |
| 4,286,675 | 9/1981 | Tuggle | 30/276 X |
| 4,463,498 | 8/1984 | Everts | |
| 4,505,040 | 3/1985 | Everts | |
| 4,654,971 | 4/1987 | Fettes et al. | |
| 4,899,446 | 2/1990 | Akiba et al. | 30/276 |
| 4,944,711 | 7/1990 | Hironaka et al. | |
| 5,088,147 | 2/1992 | MacMillan | |
| 5,228,202 | 7/1993 | Liao | |
| 5,417,511 | 5/1995 | Warden | 403/367 X |

FOREIGN PATENT DOCUMENTS

| | | |
|---|---|---|
| 0365703 | 5/1990 | European Pat. Off. |
| 2495530 | 6/1982 | France |
| 982559 | 2/1965 | United Kingdom |
| 1206778 | 9/1970 | United Kingdom |
| 1302191 | 1/1973 | United Kingdom |
| 2149358 | 6/1985 | United Kingdom |

*Primary Examiner*—Anthony Knight
*Attorney, Agent, or Firm*—Charles E. Yocum; Dennis A. Dearing; Kerry H. Owens

[57] ABSTRACT

A shaft assembly a tool comprises a first shaft part and a second shaft part and is adapted to be arranged between a handle and a working head of the tool. The first shaft part is slideable and/or rotatable within the second shaft part, and a pin is trapped within the first shaft part is adapted to engage with a co-operating receiving device in the second shaft part. A clamp is provided to secure the second shaft part relative to the first shaft part.

8 Claims, 4 Drawing Sheets

SHAFT ASSEMBLY

This application is a continuation of continuation application Ser. No. 08/336,814, filed Nov. 9, 1994, now abandoned.

BACKGROUND OF THE INVENTION

The present invention relates to a shaft assembly for a tool, in particular to a shaft assembly for a vegetation cutter, in particular a vegetation cutter that cuts by means of a filament or strip that is rotated rapidly about an axis that may be either substantially vertical or substantially horizontal, depending upon the application.

Vegetation cutters of this type are known, in which the cutting head can be rotated between a trimming mode, in which the filament or strip is rotated about a substantially vertical axis, and an edging mode in which the filament or strip is rotated about a substantially horizontal axis. It is a disadvantage of these known trimmers that the effective shaft length, that is the length between the handle and the working head, remains substantially the same whichever mode is used, and cannot be adjusted for individual operators of different heights.

It is also known to provide vegetation cutters of the type which cut by means of a filament or strip which is rotated about a substantially vertical axis, with a handle the length of which can be adjusted for different operators. The length adjustment however is by means of a complicated arrangement and is primarily intended for initial adjustment to a length which is satisfactory for an individual purchaser or operator.

It is an object of the present invention to provide a shaft assembly in which the above disadvantages are reduced or substantially obviated.

BRIEF SUMMARY OF THE INVENTION

The present invention provides a shaft assembly for a tool, which assembly comprises a first shaft part and a second shaft part and is adapted to be arranged between a handle and a working head of the tool characterised in that;

the first shaft part is slideable and/or rotatable within the second shaft part;

pin means is trapped within the first shaft part and adapted to engage with co-operating receiving means in the second shaft part; and clamp means is provided to secure the second shaft part relative to the first shaft part.

The first shaft part preferably comprises first and second mating parts. The pin means is preferably retained within the first shaft part and is free to move between a first location in the first shaft part corresponding to a maximum extension of the shaft and a second location in the first shaft part corresponding to minimum extension of the shaft.

In a preferred embodiment of the shaft assembly according to the invention, a longitudinal channel extends along a portion of the length of each of the mating parts of the first shaft part, and the pin means is mounted within the assembled first shaft part so that one end of the pin means projects through the channel in the first mating part of the first shaft part, and the other end projects through the channel in the second mating part of the first shaft part.

The second shaft part preferably comprises first and second mating parts, and a corresponding radial groove is preferably formed in the inside wall of each of the two mating parts of the second part, and sized to engage the projecting ends of the pin means.

Each radial groove is preferably provided with a stop to limit movement of the pin means and hence limit rotation of the first shaft part. The end of the second shaft part into which the first shaft part is inserted preferably terminates in a plurality preferably four, of deformable fingers, and a locking ring which is free to rotate between a disengaged and an engaged position, is provided to clamp the fingers in engagement with the first shaft part.

BRIEF DESCRIPTION OF THE SEVERAL VIEWS OF THE DRAWINGS

An embodiment of a shaft assembly according to the invention will now be described with reference to the accompanying drawings in which.

DETAILED DESCRIPTION

Figure 1:
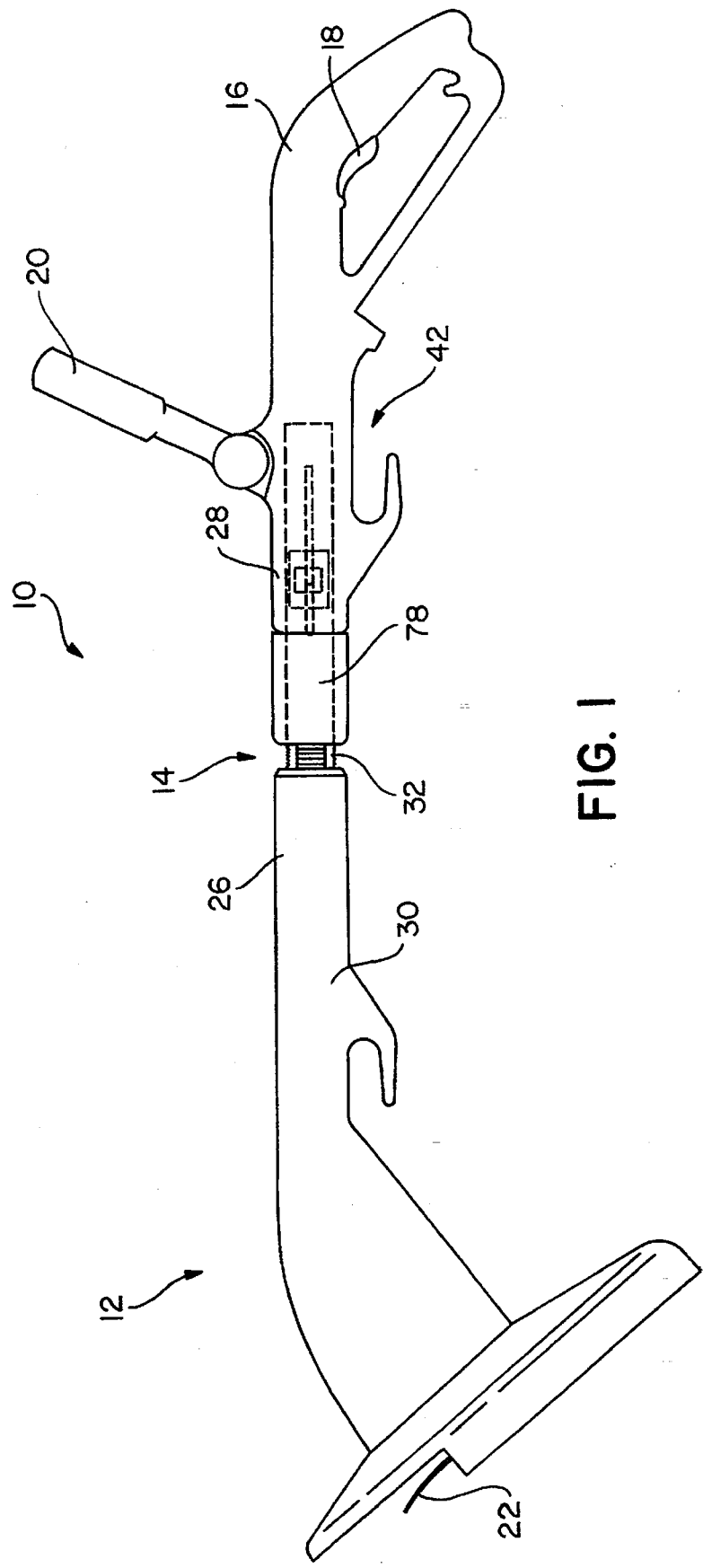
FIG. 1 is a view of a vegetation cutter comprising an embodiment of a shaft assembly according to the invention, in the partially extended mode.
Figure 2:
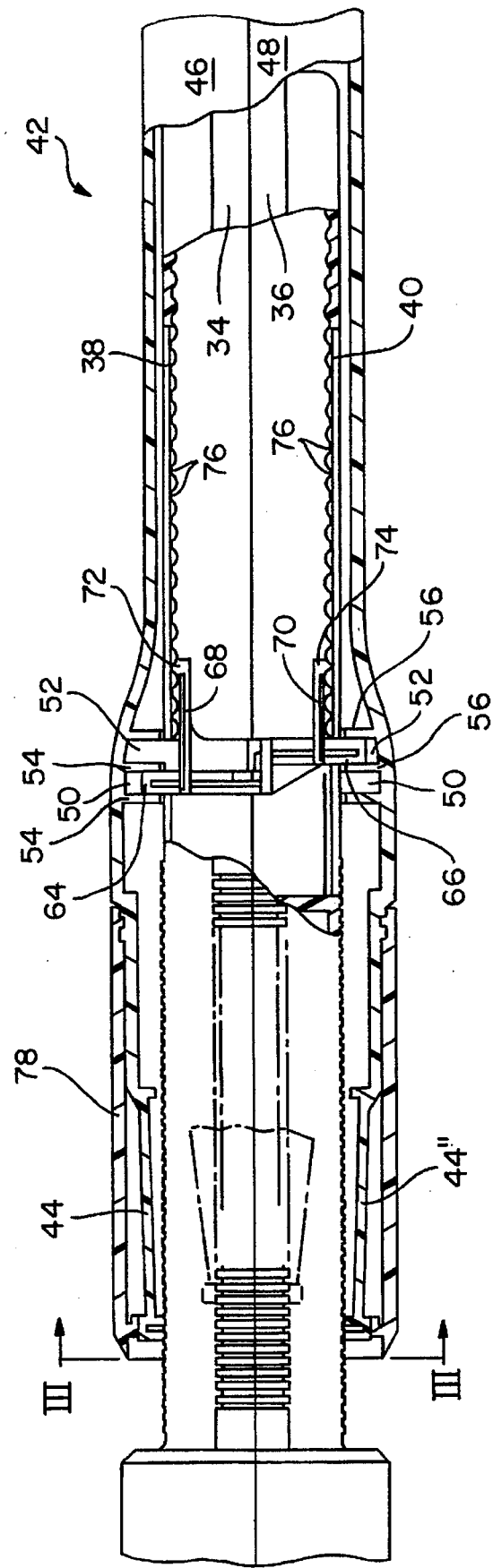
FIG. 2 is an enlarged plan view, partially in longitudinal section, of the embodiment of the shaft assembly of FIG. 1.

As can be seen from FIG. 1, a vegetation cutter (10) comprises a lower housing (12) connected by a shaft assembly (14) to a handle assembly (16). The handle assembly (16) provides a switch (18) for selectively supplying electrical power to an electric motor (not shown) carried within the housing (12). For two-handed operation of the trimmer, a secondary handle (20) is mounted on the handle assembly (16). The lower housing (12) carries a cutting head rotatable about an axis passing through the housing (12) and the cutting line (22) extends into a cutting place which is substantially perpendicular to the axis of rotation of housing (12).

The device can be adjusted in known manner from the trimming mode as shown in FIG. 1 to the edging mode by rotation of the lower housing (12) through 180° relative to the handle assembly (16).

The shaft assembly (14) comprises a first shaft part (26) and a second shaft part (28). The first shaft part (26) is of substantially cylindrical cross-section and comprises a lower section (30) which is adapted for attachment to the lower housing (12) and a upper section (32) of reduced cross-section.

The first shaft part (26) comprises first and second mating ports (34), (36). A longitudinal slot (38), (40) extends along the upper portion of the length of each of the mating parts (34), (36), commencing at a point approximately half of the way along the length of the portion of reduced cross-section, and terminating close to the free end of that portion.

The second shaft part (28) comprises a central section (42) of substantially cylindrical cross-section which terminates at its upper end in a handle assembly (16) and at its lower end with four deformable fingers (44), (44') (44") (44'''). The four deformable fingers (44), (44'), (44") and (44''') are arranged in two opposed pairs. The second shaft part (28) comprises first and second mating parts (46), (48) each of which is provided on its inner face with a pair of axially offset radial grooves (50), (52) one of which (50) extends from the centre line of the mating part (46), (48) one direction as far as the outer edge and the second of which (52) extends from the centre line of the mating part (46), (48) in the opposite direction as far as the outer edge. Each of the grooves (50), (52) is formed by a pair of parallel upstanding ribs (54), (56) which project from the inner wall of the mating part (46, (48), and is terminated by a short axial rib at the centre line.

The two mating parts (46), (48) are mirror images of each other, so that when they are assembled to form the second shaft portion (28), the first internal groove (50) extends over half of the internal circumference of the section (42) second internal groove (52) extends over the other half of the internal circumference of the section (42).

The central section (42) of the second shaft portion (28) has an internal diameter which will accept the upper section (32) of the first shaft portion (26).

The first shaft portion (26) is assembled from its two mating parts (34) (36), and a pin (62) and the pin (62) is trapped between these mating parts (34), (36) with a first arm (64) projecting through slot (38) and an opposite arm (66) projecting through slot (40).

The pin (62) is free to move along the length of the matching longitudinal slots (38), (40).

The two arms (64) (66), are offset from one another by the same amount and the radial grooves (50), (52) are relatively offset, so that when the first shaft portion (26) is inserted in the second shaft portion (28) the arms (64), (66) of the pin (62) engage in the radial grooves (50),(52) respectively.

Relative axial movement of the first shaft portion (26) and the second shaft portion (28) is thus permitted as the pin (62) moves along the length of the longitudinal slots (38), (40). Relative radial movement of the first shaft portion (26) and second shaft portion (28) is permitted as the pin (62) moves within the internal grooves (50), (52) over half of the internal circumference, and is constrained by the short axial ribs at the centre line.

Figure 5:
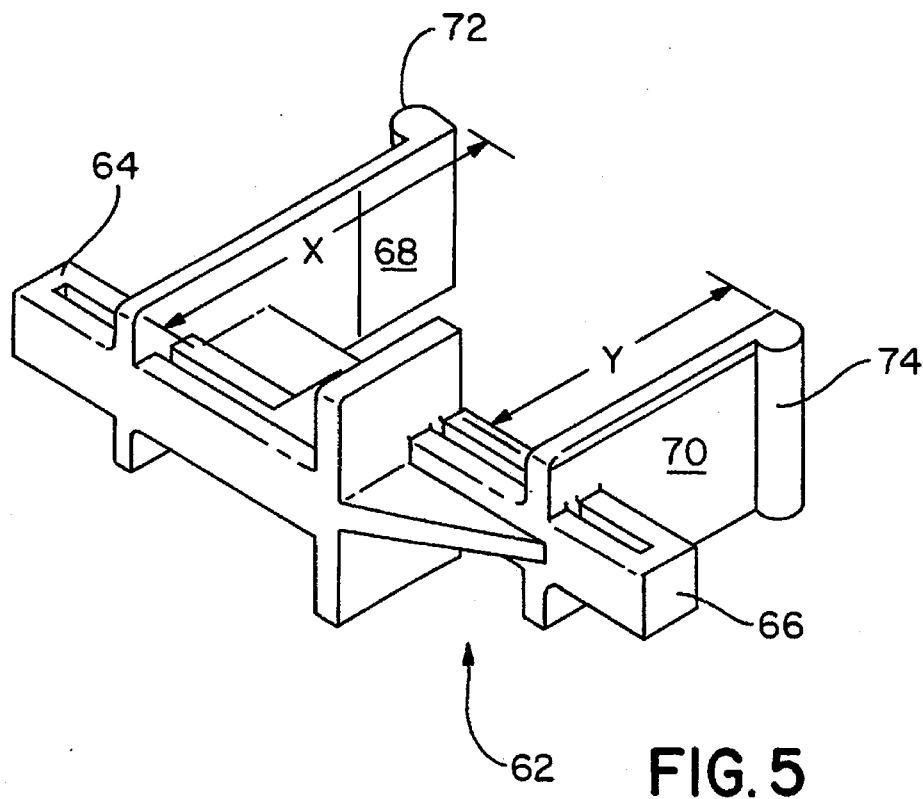
FIG. 5 is a perspective view of the pin means.

As can be seen from FIG. 5, the pin (62) further comprises extension portions (68) and (70) of right angles to the arms (64) and (66), which terminate in projections (72) and (74) respectively. These projections (72), (74) are spaced by a distance, (X), (Y) from the corresponding arm (64) and (66) respectively.

A locking ring (78) is provided to clamp the deformable fingers (44), (44'), (44") and (44'") in engagement with the first shaft part (26). The end of the second shaft part (28) which terminates in the deformable fingers is inserted within the ring (78).

Cam surfaces (80), (80'), (80") and (80'") are provided on the inner surface of locking ring (78) for engagement with the corresponding fingers (44), (44'), (44") and (44'").

A pair of internal axial ribs (not shown), are provided on the internal surface of the locking ring (78) close to the end of the ring remote from the cam surfaces (80), (80'), (80"), (80'") for engagement with corresponding external projections (not shown) on the second shaft portion (28) to limit the ability of the ring to rotate relative to the shaft portion.

Figure 3:
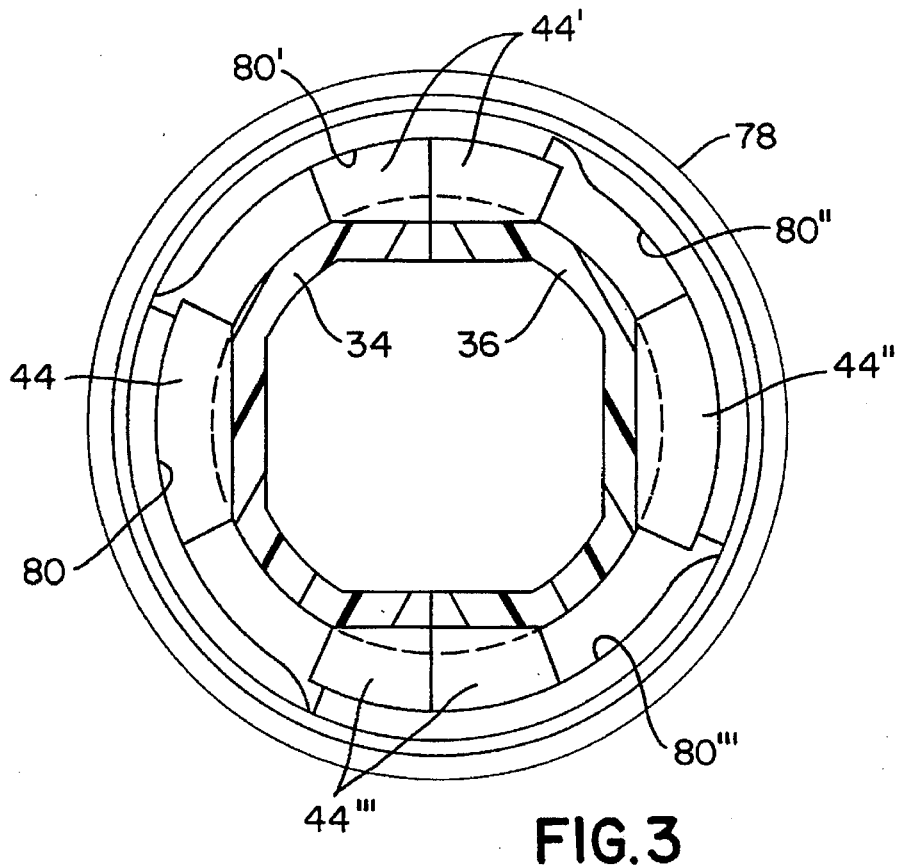
FIG. 3 is a cross-section on line III—III of FIG. 2, showing the locking ring in locked position.

FIG. 3 shows the locking ring (78) in the clamping position, in which the cam surfaces (80), (80'), (80"), (80'") are in engagement with the deformable fingers (44), (44'), (44") and (44'") and clamping these fingers against the upper section (32) of the first shaft part (26).

Figure 4:
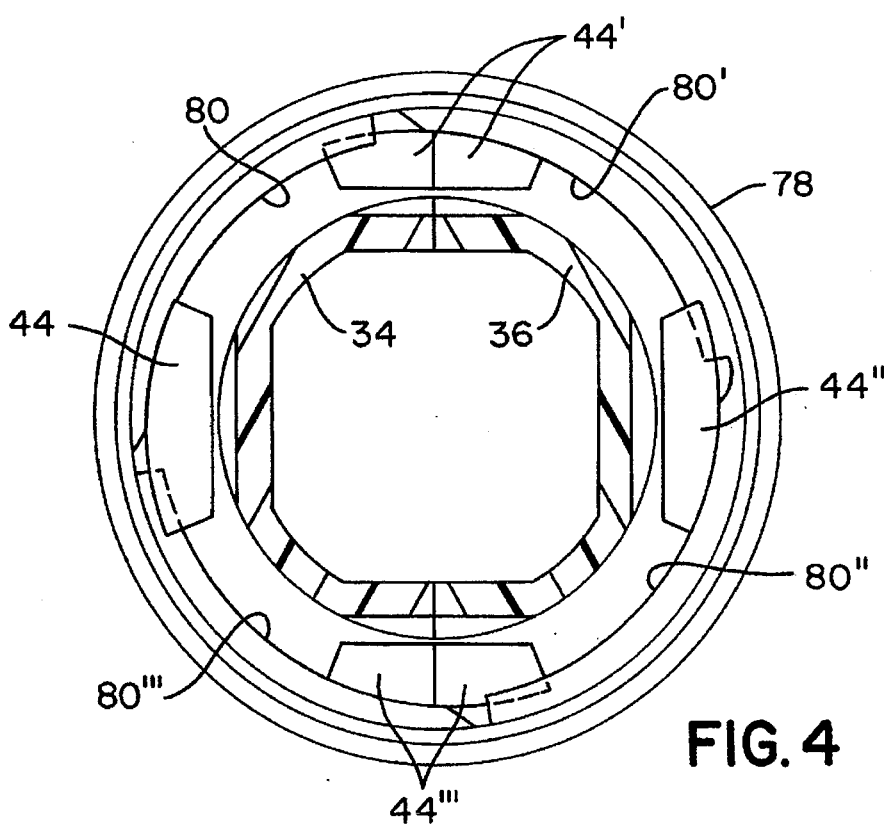
FIG. 4 is a similar section to that of FIG. 3, showing the locking ring in unlocked position.

In the position shown in FIG. 4, the locking ring (78) has been rotated relative to the first shaft part (26) and the fingers (44), (44'), (44") and (44'") have been released from engagement with the first shaft part (26). The second shaft part (28) is thus free to rotate relative to the first shaft part (26).

Notches (76) are provided on the internal surface of the first shaft portion (26) which, in co-operation with the projections (72) and (74), control unwanted relative axial movement of the first and second shaft portions (26), (28) when the locking ring (78) is released and provide an audible indication of the relative axial positions of the first and second shaft portions (26), (28)

A spring (not shown) may be provided to bias the projections (72) and (74) away from each other and towards the notches (76).

In an alternative embodiment of the shaft assembly according to the invention, provision is made for the shaft assembly either to be adjustable both in the axial and radial directions, as in the first embodiment or simply in the radial direction, to allow rotation of the head relative to the handle. It may be desirable to provide both alternative types of adjustment in a range of products, and to use the same clamshells for both models, thus reducing the cost of manufacture.

Figure 6:
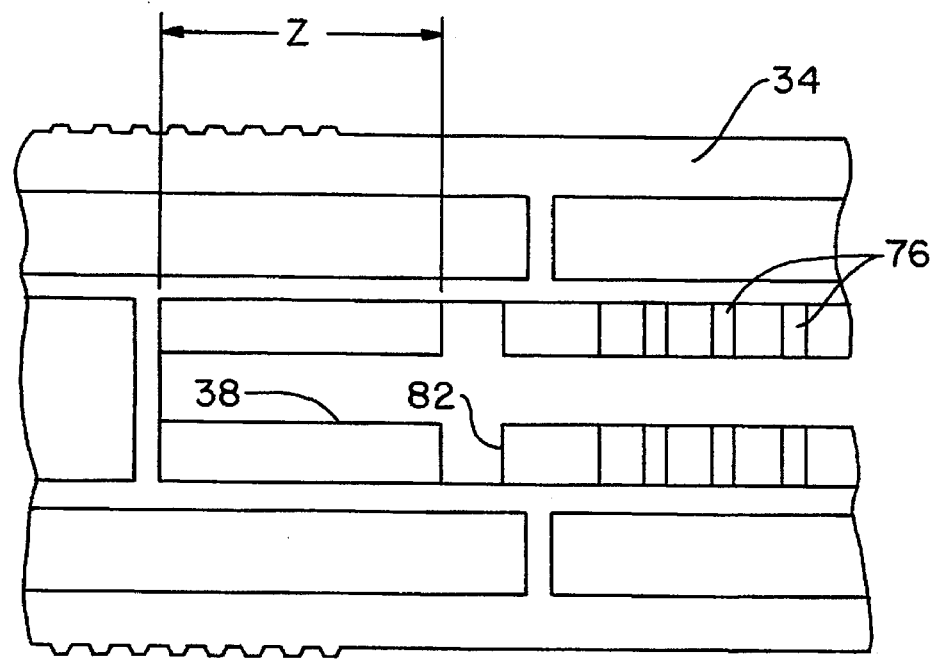
FIG. 6 is part side view of an alternative embodiment of shaft assembly.

In order to provide a shaft assembly according to the present invention in which the clamshell can be used for both models, the first and second mating parts (34) and (36) of the first shaft portion (26) are modified as shown in FIG. 6. In one or each part, at the end of the slot (38), (40) remote from the free end of the upper section (32) are provided with a short cross groove (82) at a distance (Z) less than the pin (62) dimension (X) or (Y) from the end of the slot (38) or (40).

If it is intended that the shaft portion (26) is for use in a shaft assembly which is adjustable both in the axial and radial directions, then a pin (62) as shown in FIG. 5 is used and the assembly and operation are exactly as described for the first embodiment, the cross groove (82) having no effect. If however, the shaft portion (26) is for use in a shaft assembly which is only adjustable in the radial direction, then the pin (62) is replaced by an alternative design of pin in which the extension portions (68) and (70) are reduced in length and the projections (72) and (74) are increased in height, so that the distance between the projections (72) and (74) and the arms (64) and (66) respectively, is equal to or less than the distance (Z) defined above. This has the effect that when the shaft is first assembled, projections (72) and (74) are trapped within the cross-grooves, and axial movement of the first shaft portion (26) relative to the second shaft portion (28) is no longer possible.

I claim:

1. A shaft assembly for a tool, which assembly comprises a first shaft part and a second shaft part and is adapted to be arranged between a handle and a working head of the tool wherein the first shaft part comprises first and second mating parts and is slideable and/or rotatable within the second shaft part;

pin means is trapped within the first shaft part and is free to move between a first location in the first shaft part corresponding to maximum extension of the shaft and a second location in the first shaft part corresponding to minimum extension of the shaft, the pin means being adapted to engage with co-operating receives means in the second shaft part; and clamp means is provided to secure the second shaft part relative to the first shaft part.

2. A shaft assembly according to claim 1 wherein a longitudinal channel extends along a portion of the length of each of the mating parts of the first shaft part, and the pin means is mounted within the assembled first shaft part so that one end of the pin means projects through the channel in the first mating part of the first shaft part, and the other end projects through the channel in the second mating part of the first shaft part.

3. A shaft assembly according to any of claim 1, wherein the second shaft part comprises first and second mating parts.

4. A shaft assembly according to claim 3 wherein a corresponding radial groove is formed in the inside wall of each of the two mating parts of the second shaft part.

5. A shaft assembly according to claim 4 wherein the radial grooves formed in the inside walls of the second shaft part are sized to engage the projecting ends of the pin means.

6. A shaft assembly according to claim 4, wherein each radial groove is provided with a stop to limit movement of the pin means and hence limit rotation of the first shaft part.

7. A shaft assembly according to any of claim 1, wherein the end of the second shaft part into which the first shaft part is inserted, terminates in a plurality of deformable fingers, and a locking ring is provided to clamp the fingers in engagement with the first shaft part.

8. A shaft assembly according to claim 7, wherein the second shaft part terminates in four deformable fingers, and the locking ring is free to rotate between a disengaged and an engaged position.

* * * * *